J. T. BRUEN.
WIRE-SCREW AND NUT.

No. 191,304. Patented May 29, 1877.

WITNESSES:
C. Neveux
J. H. Scarborough

INVENTOR:
J. T. Bruen
BY Munn & Co.
ATTORNEYS.

UNITED STATES PATENT OFFICE.

JOHN T. BRUEN, OF BROOKLYN, NEW YORK.

IMPROVEMENT IN WIRE SCREWS AND NUTS.

Specification forming part of Letters Patent No. 191,304, dated May 29, 1877; application filed April 2, 1877.

*To all whom it may concern:*

Figure 1:
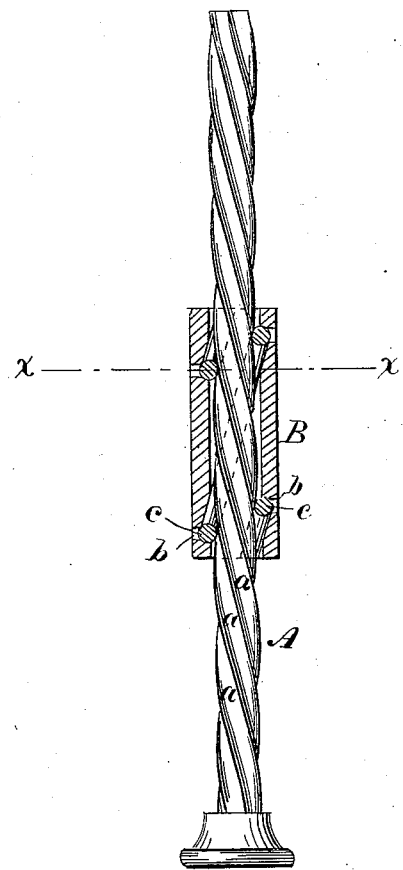
Figure 2:
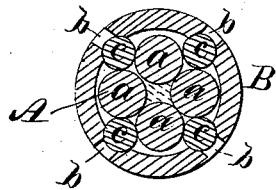

Be it known that I, JOHN T. BRUEN, of Brooklyn, in the county of Kings and State of New York, have invented a new and Improved Wire Screw and Nut, of which the following is a specification:

Figure 1 is a side elevation in part section. Fig. 2 is a transverse section on line $x\,x$ in Fig. 1.

The invention will first be described in connection with the drawing, and then pointed out in the claim.

To make the screw, I take two, three, or any number of wires desired, and, by means of suitable tools, twist them together, so as to form a screw of even pitch, and I fasten the wires together at their ends by means of solder or otherwise. They may also be soldered together throughout their entire length, if desired.

To form a nut for the screw just described, I take a thimble or section of pipe that will fit loosely over the screw, and form in it slots corresponding in number and direction with the grooves between the wires of the screw, and in these slots I place wires, which extend through the sides of the thimble, which may be either straight or slightly curved, and set the metal of the thimble down around the wire to hold it firm in its slot, allowing it to project inwardly sufficiently to engage the threads of the screw.

In the drawing, A is a screw, consisting of the wires $a\,a$, twisted together to form a thread of even pitch. B is the nut, consisting of a thimble, in which slots $b$ are formed for receiving the wires $c$, which are retained by closing the metal at the sides of the slot down upon them.

The advantages claimed for my invention are the facility with which the screw may be manufactured in great lengths, having small diameter, and the strength and adaptability of the nut; also, obtaining by this peculiar arrangement a minimum amount of friction with a maximum of strength and durability.

Having thus described my invention, what I claim as new, and desire to secure by Letters Patent, is—

The method of forming a nut for wire screws by slotting a loose tube over the grooves of the screw, inserting in said slots wires that project into said grooves, and setting the metal of the tube down around the wire, as described.

JNO. T. BRUEN.

Witnesses:
 C. SEDGWICK,
 ALEX. F. ROBERTS.